UNITED STATES PATENT OFFICE.

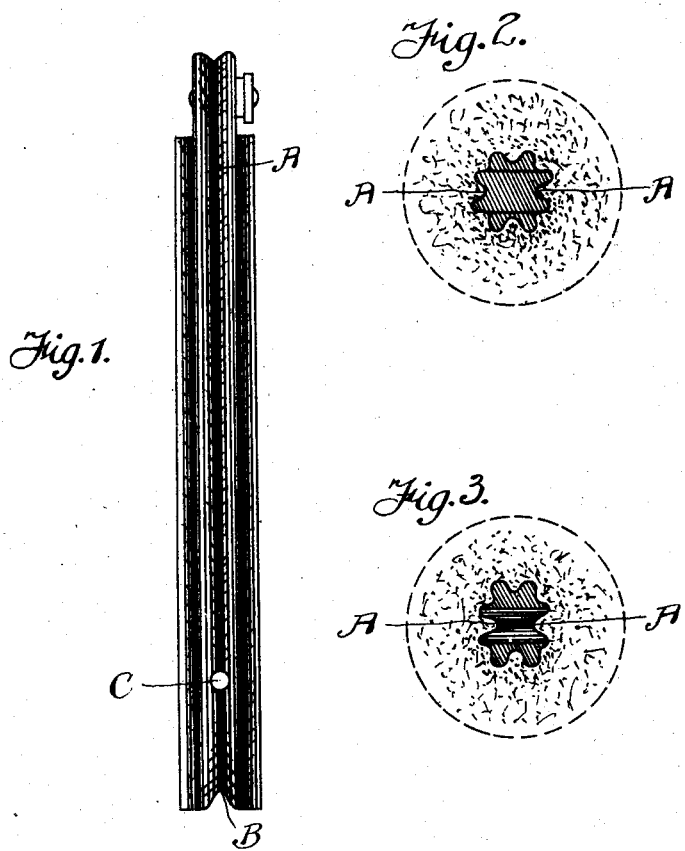

JOSEPH THEODOR SZEK, OF LONDON, ENGLAND.

CARBON ELECTRODE.

No. 901,497.

Specification of Letters Patent.

Patented Oct. 20, 1908.

Application filed September 23, 1907. Serial No. 394,247.

*To all whom it may concern:*

Be it known that I, JOSEPH THEODOR SZEK, residing at 53/54 Chancery Lane, London, W. C., England, have invented certain new and useful Improvements in Carbon Electrodes; and I do hereby declare the following to be a full, clear, and exact description of the invention, such as will enable others skilled in the art to which it appertains to make and use the same.

This invention relates to carbon electrodes applicable to electric batteries and is so arranged that the atmospheric air can freely circulate along and around the whole length of the carbon and the depolarizing mass. For this purpose I use carbon rods made with grooves or corrugations along their length. I then provide a deep groove or hole near the bottom of the carbon in such a manner that the side grooves are connected and form a continuous channel round the length of the carbon and in this way will form a ventilation shaft, on the depolarizing mass being pressed round.

To obtain a clear ventilation shaft it is advisable to insert into the groove a glass tube or rod of any suitable material which can subsequently be removed when the cell is finished. The ventilation shaft will permit the atmospheric air freely to circulate and cause a revivification of the carbon and depolarizing mass. In some instances suitable gaseous, solid or liquid oxidizing agents can be inserted or forced through.

I will now proceed to describe my invention more particularly by reference to the accompanying drawings in which:—

Figure 1. is an elevation of my carbon electrode. Fig. 2. is a plan. Fig. 3. is a plan of base.

In the drawings I have shown a carbon electrode of a corrugated section as illustrated at A, Figs. 2 and 3, with a view of giving as much surface as possible to the depolarizing matter packed around the same, and also at the same time to provide a ventilation shaft up which the gases evolved owing to the electro-chemical processes at work in any given cell may escape. To make the ventilation shaft continuous along and under this electrode, I form a channel B at the base of the electrode and at a given point or points in its length a hole C causing in both cases communication between the opposite sides of the electrode. To further enhance the desired effect I may by means of a rod inserted in one or more of the corrugations during the packing process, and withdrawn subsequently, provide a clear communicating channel around the electrode—see A Fig. 2.

I am aware that partial ventilation has been practiced hitherto in making carbon electrodes, but so tightly does the depolarizing material adhere to the carbon that unless a clear passage exists all round the said electrode there is grave danger of the imprisoned gases bursting the cell, or forcing the carbon out of place.

I claim:—

A carbon electrode provided with longitudinal grooves throughout its length, a passage through said electrode and a transverse groove at the base of said electrode said passage and said transverse groove communicating with a plurality of the said longitudinal grooves, substantially as described.

In testimony whereof I affix my signature, in presence of two witnesses.

JOSEPH THEODOR SZEK.

Witnesses:
N. R. JAURALDE,
F. W. SMITH.